United States Patent [19]
Stevens, III

[11] Patent Number: 5,769,643
[45] Date of Patent: Jun. 23, 1998

[54] INSTRUCTION COMMUNICATION SYSTEM

[75] Inventor: Harden E. Stevens, III, Lexington, S.C.

[73] Assignee: NCR Corporation, Dayton, Ohio

[21] Appl. No.: 597,729

[22] Filed: Feb. 7, 1996

[51] Int. Cl.[6] .............................. G09B 3/00; G09B 5/00; G09B 7/00
[52] U.S. Cl. ..................... 434/350; 434/307 R; 434/322; 434/323; 434/351
[58] Field of Search .............................. 434/307 R, 322, 434/323, 351, 350

[56] References Cited

U.S. PATENT DOCUMENTS

| | | | |
|---|---|---|---|
| 4,251,865 | 2/1981 | Moore et al. | 364/200 |
| 4,367,485 | 1/1983 | Hemmie | 358/86 |
| 4,456,793 | 6/1984 | Baker et al. | 179/99 R |
| 4,625,274 | 11/1986 | Schroeder | 364/200 |
| 4,661,659 | 4/1987 | Nishimura | 379/61 |
| 4,742,352 | 5/1988 | Ishii | 340/825.47 |
| 4,779,138 | 10/1988 | Nomura et al. | 358/236 |
| 4,850,009 | 7/1989 | Zook et al. | 379/96 |
| 4,916,441 | 4/1990 | Gombrich | 340/712 |
| 4,972,457 | 11/1990 | O'Sullivan | 379/59 |
| 5,002,491 | 3/1991 | Abrahamson et al. | 434/322 |
| 5,023,905 | 6/1991 | Wells et al. | 379/96 |
| 5,043,721 | 8/1991 | May | 340/825.44 |
| 5,079,628 | 1/1992 | Tomikawa | 358/86 |
| 5,187,352 | 2/1993 | Blair et al. | 235/382 |
| 5,189,632 | 2/1993 | Paajanen et al. | 364/705.05 |
| 5,249,044 | 9/1993 | Von Kohorn | 358/86 |
| 5,302,947 | 4/1994 | Fuller et al. | 340/825.34 |
| 5,561,446 | 10/1996 | Montlick | 345/173 |

OTHER PUBLICATIONS

Press, Larry, "Tomorrow's Campus", Communications of the ACM, vol. 37, No. 7, pp. 13–17, Jul. 1994.

*Primary Examiner*—Richard J. Apley
*Assistant Examiner*—John Edmund Rovnak
*Attorney, Agent, or Firm*—Paul W. Martin

[57] ABSTRACT

An instruction communication network which employs low-cost cordless telephone technology to broadcast information to students. A first computer operated by a student includes a first cordless telephone transceiver. A second computer operated by a teacher transfers instruction data to the first computer and includes a second cordless telephone transceiver. The cordless telephone transceivers preferably operate at frequencies designated by the FCC and has a transmission range less than five thousand feet. A typical frequency of operation is in a frequency band near 900 MHz. The first computer may encrypt responses to the instruction data.

13 Claims, 4 Drawing Sheets

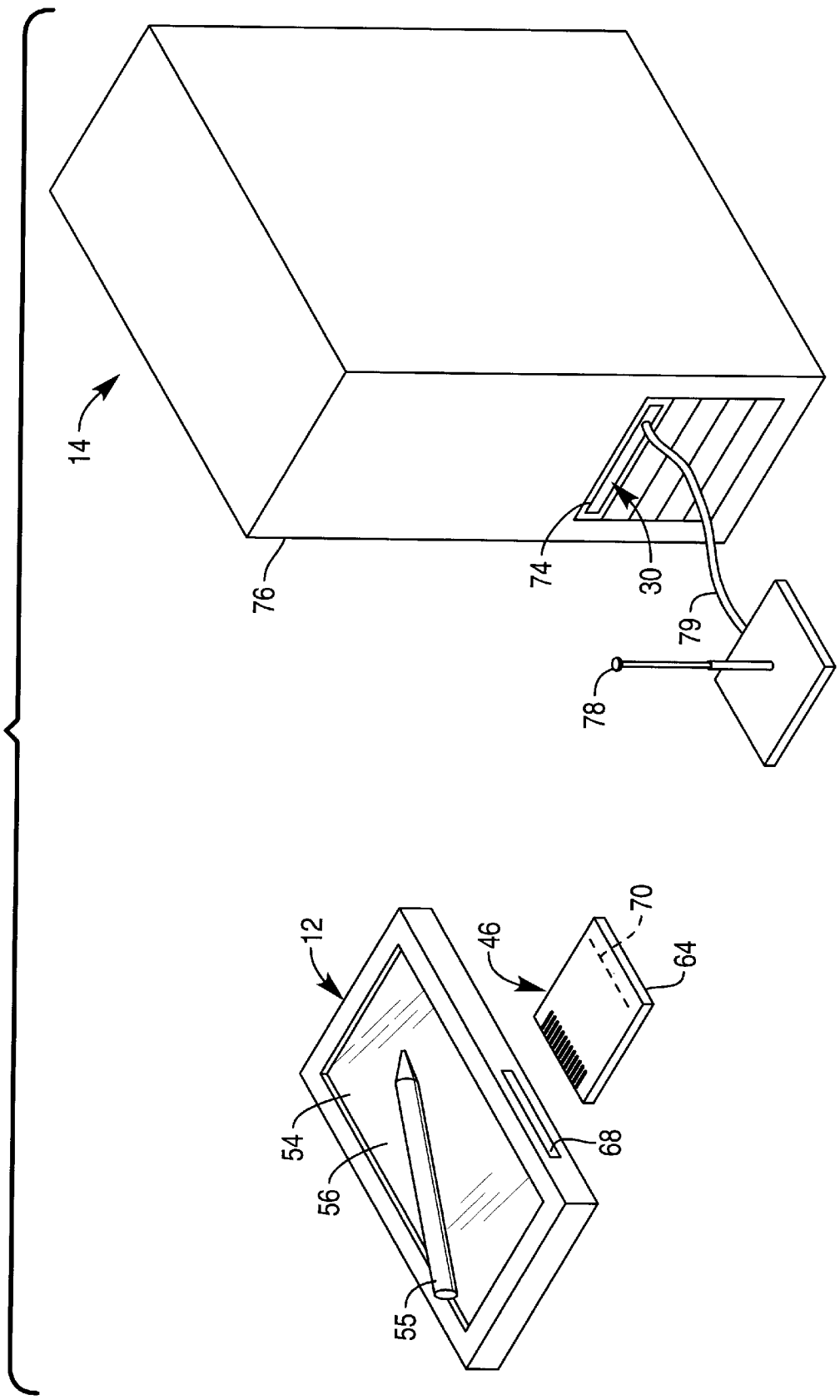

INSTRUCTION COMMUNICATION SYSTEM

CROSS-REFERENCE TO RELATED APPLICATIONS

The present invention is related to the following commonly assigned and co-pending U.S. applications:

"Short Range Wireless Portable Computing Device and Method", filed Feb. 7, 1996, invented by Stevens, and having a Ser. No. 08/597,725;

"Restaurant Transaction Processing System and Method", filed Feb. 7, 1996, invented by Stevens, and having a Ser. No. 08/597,726;

"Broadcast Information System and Method", filed Feb. 7, 1996, invented by Stevens, and having a Ser. No. 08/597,727; and "Shopping System", filed Feb. 7, 1996, invented by Stevens, and having a Ser. No. 08/597,728, all of which are pending.

BACKGROUND OF THE INVENTION

The present invention relates to teaching devices, and more specifically to an instruction communication system.

Computers may be found in most schools today. Students typically use them only during predetermined time periods. Once the computer exercises are finished, the students and teachers abandon them in favor of more traditional instruction methods. For example, teachers typically create and administer tests in the form of a paper record. Students write their answers on the paper record and hand-carry the tests to the teacher.

Portable computing devices have been known to wirelessly communicate with computer systems. Cellular and RF modems provide a wireless communication connection that relies on an external phone network. Wireless network systems provide an in-office alternative to cable connections. Finally, very short range infra-red line of sight systems provide a simple method of coupling a notebook computer to a host system primarily for file transfer purposes. One disadvantage with these devices is that they are ill-suited for portable operation.

Therefore, it would be desirable to provide an instruction communication system which employs short range wireless communication devices as interactive teaching tools. It would be desirable for the wireless communication devices to receive information from a teacher's computer and to transmit solicited information back to the teacher's computer.

SUMMARY OF THE INVENTION

In accordance with the teachings of the present invention, an instruction communication system is provided. The instruction communication system employs low-cost cordless telephone technology to broadcast information to students. A first computer operated by a student includes a first cordless telephone transceiver. A second computer operated by a teacher transfers instruction data to the first computer and includes a second cordless telephone transceiver. The cordless telephone transceivers preferably operate at frequencies currently designated by the FCC under Part 15 for this type of function or in the Instrumentation, Scientific and Medical (ISM) band or at bands designated as unlicensed bands or in private bands. The term "cordless" is herein defined to exclude "cellular" telephones, which operate at different frequencies designated by the FCC. The transceivers adhere to FCC transmission protocols required for each band and have a practical transmission range less than five thousand feet. A typical frequency of operation is in a frequency band near 900 MHz. The first computer may encrypt responses to the instruction data.

It is accordingly an object of the present invention to provide an instruction communication system.

It is another object of the present invention to provide an instruction communication system which employs low-cost cordless telephone transceivers.

It is another object of the present invention to provide an instruction communication system in which a student computer encrypts a student's responses before transmitting them to a teacher's computer.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 4 is a perspective view of the system of FIG. 3.

DETAILED DESCRIPTION OF THE PREFERRED EMBODIMENT

Figure 1:
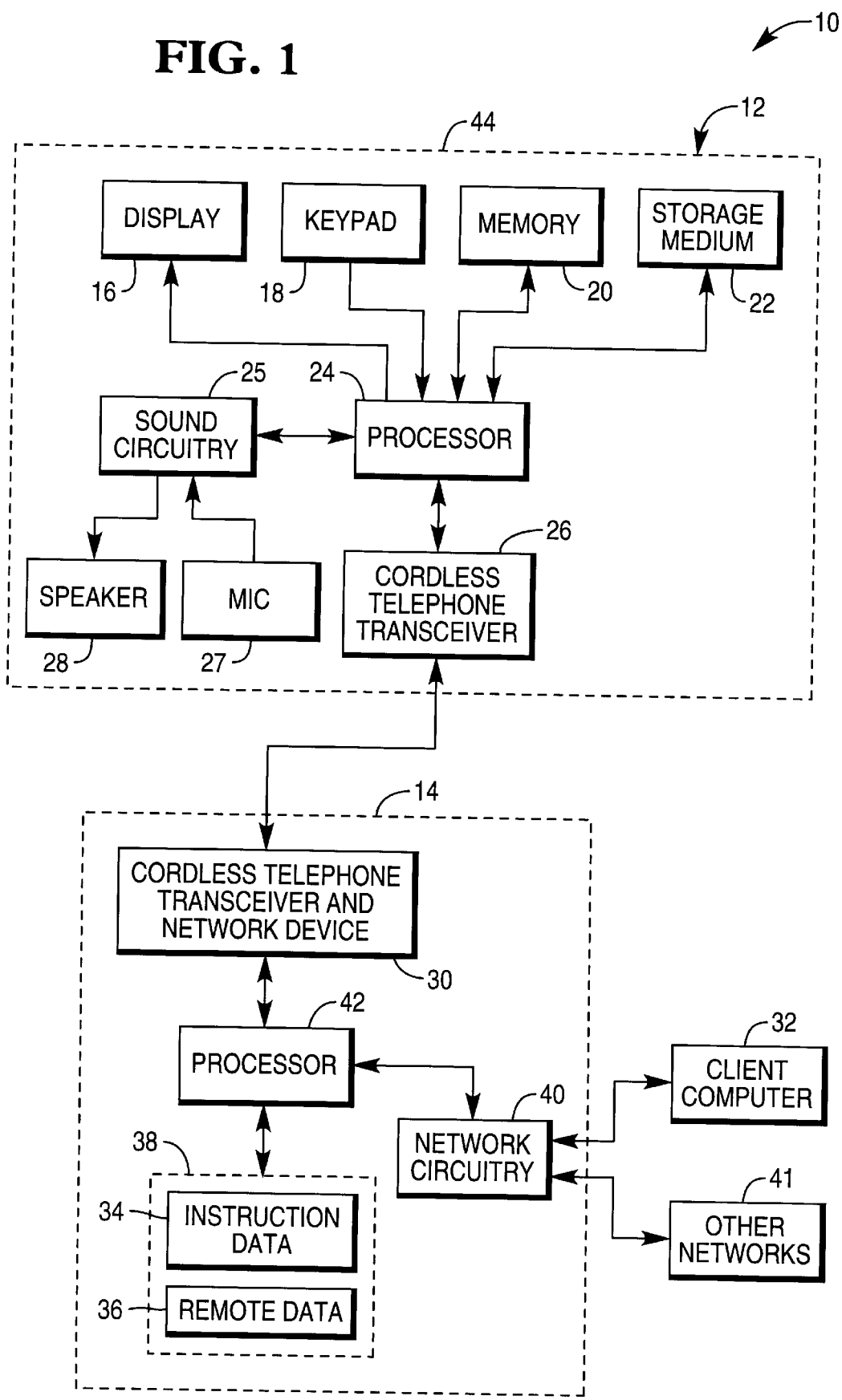
FIG. 1 is a block diagram of a first embodiment of the instruction communication system of the present invention.
Figure 2:
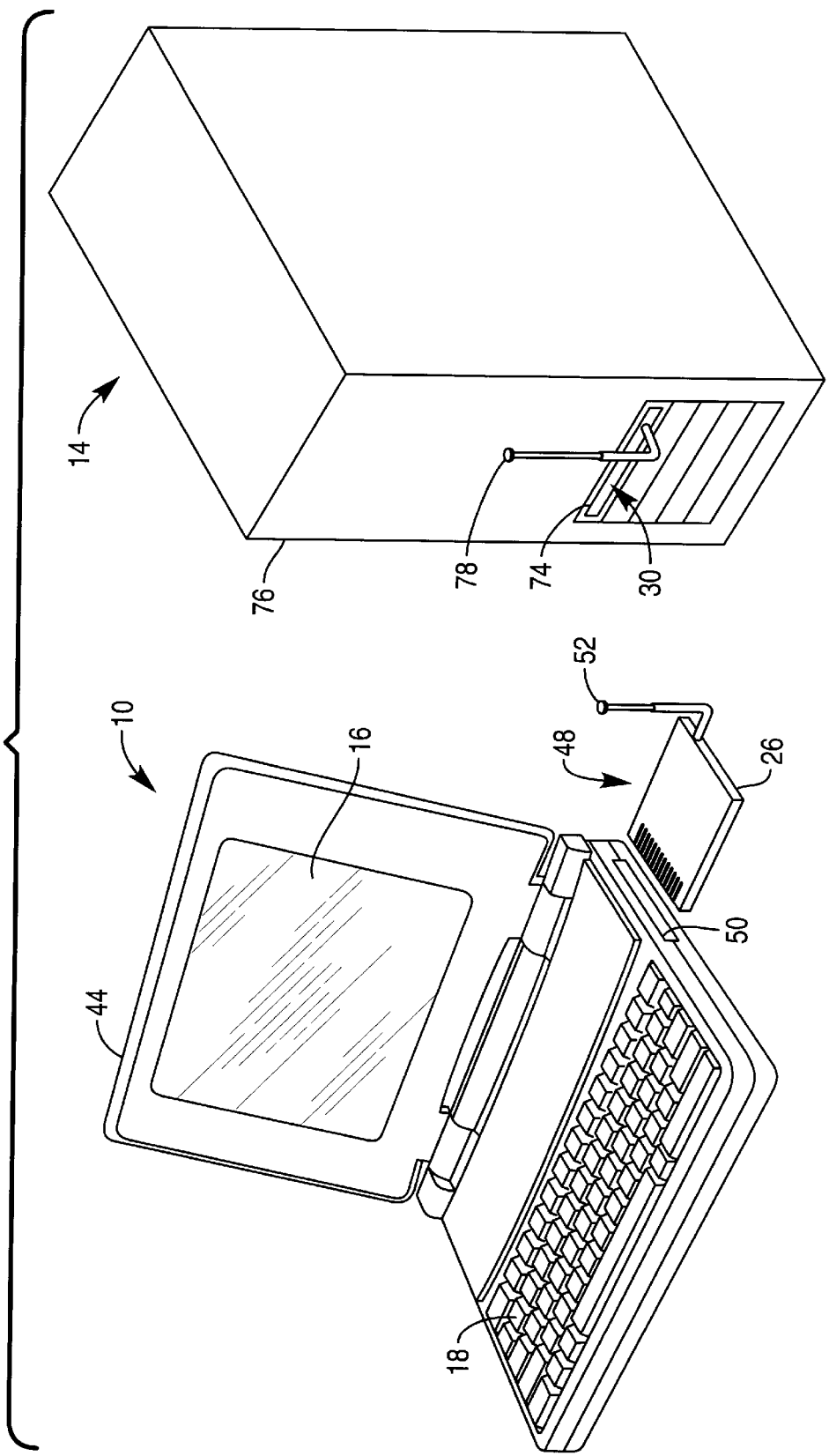
FIG. 2 is a perspective view of a wireless communication device and a server within the system of FIG. 1.

Referring now to FIGS. 1 and 2, instruction communication system 10 includes short range wireless computing device 12 and computer 14. System 10 may include an additional computer 32 coupled to computer 14 to form a network.

Computer system 14 primarily includes processor 42, storage medium 38, cordless telephone transceiver and network device 30, and network circuitry 40.

Storage medium 38 stores instruction data 34 and remote data 36 from device 12.

Network circuitry 40 allows computer 14 to network with additional computer 32 as a server, and to link to other networks 41 having servers equipped with cordless telephone transceivers. When acting as a server of a local area network (LAN), computer system 14 may be connected to the Internet using the transmission control protocol/internet protocol (TCP/IP) and provide Internet service to short range wireless computing device 12.

Cordless telephone transceiver and network device 30 allows host computer 14 to network with and wirelessly communicate with device 12. As its name implies, device 30 includes low-cost commercially available cordless phone receiver and transmitter circuitry, and commercially available network adapter circuitry. The cordless telephone transceiver portion is the type commonly found in homes and offices as a replacement for telephones having headsets connected to base units by flexible, yet limited length, telephone cords. The cordless telephone transceiver portion can communicate with another such portion in another computer in the same way that a cordless telephone communicates with its base unit.

Computer system 14 transmits instruction data 34 to students and receives solicited responses from students who each have a wireless communication device 12. For a typical school or teaching session, instruction data 34 may include home work assignments, tests, and test scores. Instruction data 34 may include lectures and examples that illustrate topics within the lectures.

Additional computer 32 may be any commercially available networked computer system.

Device 12 primarily functions to receive, display, and/or make audible the instruction data 34. It may also send information back to computer system 14 when computer system 14 is configured to receive and process the information. For example, a student equipped with device 12 may receive a broadcast message from computer system 14 requesting that the holder complete a test. The message may include instructions audible through speaker 28. The student completes the test and transmits the answers to computer system 14 for processing and storage as remote data 36. Under the present invention, a plurality of devices 12 are used in the classroom or teaching session.

In conjunction with speaker 28, sound circuitry 25 and microphone 27 provide limited two-way voice transmission and voice store and forward functions.

Device 12 preferably includes the components of a typical notebook computer 44 (FIG. 2).

As a notebook computer 44, device 12 includes display 16, keypad 18, memory 20, storage medium 22, processor 24, cordless telephone transceiver 26, and speaker 28.

Cordless telephone transceiver 26 may be built into device 12, or packaged as a PC card 48 which is inserted into PC card controller 50. (PC cards were formerly known as PCMCIA cards.) An antenna 52 attaches to PC card 48. Antenna 52 may also be integrated into PC card 48.

Figure 3:
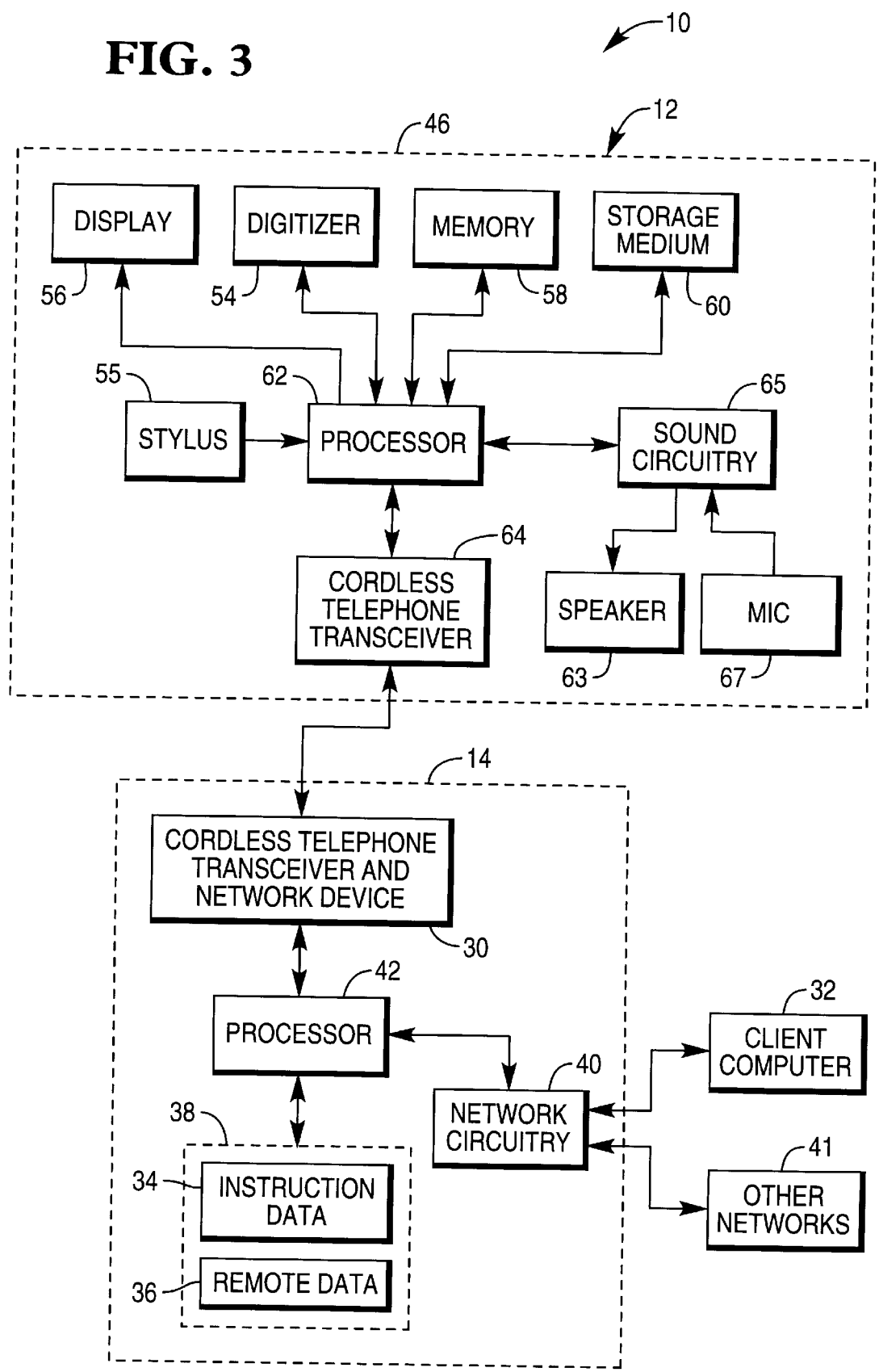
FIG. 3 is a block diagram of a second embodiment of the instruction communication system.

Turning now to FIGS. 3 and 4, a second embodiment of the short range wireless computing device 12 of the present invention is shown. As a pen computer, such as a portable digital assistant (PDA), device 12 includes digitizer 54, stylus 55, display 56, memory 58, storage medium 60, processor 62, speaker 63, cordless telephone transceiver 64, sound circuitry 65, and microphone 67.

The second embodiment of device 12 operates in a similar fashion to the first embodiment, except for the replacement of keypad 18 with digitizer 54 and stylus 55.

Cordless telephone transceiver 64 may be built into device 12, or packaged as a PC card 46 which is inserted into PC card controller 68. Antenna 70 is preferably integrated into PC card 46. Antenna 70 may also be remotely located from PC card 46 and attached to PC card 46 through a cable.

In either embodiment, cordless telephone transceiver and network device 30 is shown as an adapter card 74 which is inserted into a bus expansion connector within host computer cabinet 76. An antenna 78 may be coupled directly to adapter card 74 or remotely located from adapter card 74 for better reception and coupled to adapter card 74 through coaxial cable 79.

Cordless telephone transceivers 26, 30, and 64 typically operate at low power. The transmission range for such cordless transceivers is less than five thousand feet.

Cordless telephone transceivers 26, 30, and 64 preferably operate at frequencies designated by the FCC for this type of function or in the Instrumentation, Scientific and Medical (ISM) band or at bands designated as unlicensed bands or in private bands. The transceivers adhere to FCC transmission protocols required for each band. A typical frequency of operation is in a frequency band near 900 MHz.

Remote data 34 entered into device 12 may be stored in host computer 14 and accessed by client computer 32.

Similarly, client data 36 may be accessed by device 12. Both host computer 14 and client computer 32 may employ known encryption techniques to secure the data.

Although the invention has been described with particular reference to certain preferred embodiments thereof, variations and modifications of the present invention can be effected within the spirit and scope of the following claims.

What is claimed is:

1. An instruction communication network comprising:
   a first computer operated by a student including a first cordless telephone transceiver; and
   a second computer operated by a teacher which transfers instruction data to the first computer including a second cordless telephone transceiver;
   wherein the first and second cordless telephone transceivers have a transmission range less than five thousand feet operate at cordless telephone frequencies designated by the FCC.

2. The network as recited in claim 1, wherein the first computer sends response data to the second computer.

3. The network as recited in claim 1, wherein the instruction data is a test and wherein the first computer sends test responses to the second computer.

4. The network as recited in claim 3, wherein the first computer encrypts the test responses before sending it to the second computer.

5. The network as recited in claim 1, wherein the instruction data is homework and wherein the first computer sends homework responses to the second computer.

6. The network as recited in claim 5, wherein the first computer encrypts the response data before sending it to the second computer.

7. The network as recited in claim 1, wherein the first computer comprises a notebook computer having a PCMCIA port and the cordless telephone transceiver includes a PCMCIA card which fits within the PCMCIA port.

8. The network as recited in claim 1, wherein the second computer comprises a server having a system bus and an expansion connector coupled to the system bus, and wherein the cordless telephone transceiver includes an adapter card which couples to the expansion connector.

9. The network as recited in claim 1, wherein the first computer comprises a pen computer having a PCMCIA port and the cordless telephone transceiver includes a PCMCIA card which fits within the PCMCIA port.

10. The network as recited in claim 1, wherein the first computer comprises a display for displaying the instruction data.

11. The network as recited in claim 1, wherein the first computer comprises a speaker for audiblizing the instruction data.

12. The network as recited in claim 1, wherein the first computer and the second computer encrypt all transmissions from the first and second cordless phone transceivers.

13. An instruction communication network comprising:
    a plurality of computers each including a cordless telephone transceiver and operated by a student; and
    another computer including a cordless telephone transceiver and operated by a teacher which transfers instruction data to the plurality of computers and which receives student data from the plurality of computers;
    wherein the cordless telephone transceivers have a transmission range less than five thousand feet operate at cordless telephone frequencies designated by the FCC.

* * * * *